United States Patent
Yahata

(10) Patent No.: US 9,976,619 B2
(45) Date of Patent: May 22, 2018

(54) TUBULAR VIBRATION-DAMPING DEVICE

(71) Applicant: SUMITOMO RIKO COMPANY LIMITED, Komaki-shi, Aichi (JP)

(72) Inventor: Yuki Yahata, Komaki (JP)

(73) Assignee: SUMITOMO RIKO COMPANY LIMITED, Komaki-shi, Aichi (JP)

( * ) Notice: Subject to any disclaimer, the term of this patent is extended or adjusted under 35 U.S.C. 154(b) by 0 days. days.

(21) Appl. No.: 15/226,644

(22) Filed: Aug. 2, 2016

(65) Prior Publication Data

US 2016/0341271 A1 Nov. 24, 2016

Related U.S. Application Data

(63) Continuation of application No. PCT/JP2015/074879, filed on Sep. 1, 2015.

(30) Foreign Application Priority Data

Sep. 25, 2014 (JP) .................. 2014-194596

(51) Int. Cl.
*F16F 1/38* (2006.01)
*F16F 15/08* (2006.01)

(52) U.S. Cl.
CPC .............. *F16F 1/38* (2013.01); *F16F 1/3842* (2013.01); *F16F 1/3863* (2013.01); *F16F 15/08* (2013.01); *F16F 2226/045* (2013.01)

(58) Field of Classification Search
CPC .......... F16F 1/38; F16F 1/3842; F16F 1/3863; F16F 15/08; B60G 21/052
USPC ......................... 267/141, 141.2, 141.3, 141.4
See application file for complete search history.

(56) References Cited

U.S. PATENT DOCUMENTS

| 7,104,533 B2 | 9/2006 | Kato et al. | |
| 7,866,640 B2 * | 1/2011 | Funano | B60G 21/052 267/141.4 |
| 8,939,437 B2 * | 1/2015 | Kobori | F16F 1/3735 267/140.3 |
| 2004/0108639 A1 * | 6/2004 | Kato | F16F 1/3842 267/141 |

(Continued)

FOREIGN PATENT DOCUMENTS

| CN | 1990287 A | 7/2007 | |
| DE | 3624280 A1 * | 1/1988 | ............ F16F 1/3863 |
| EP | 1186794 A2 * | 3/2002 | ............ F16F 1/3863 |

(Continued)

OTHER PUBLICATIONS

Dec. 1, 2015 International Search Report issued in International Patent Application No. PCT/JP2015/074879.

(Continued)

*Primary Examiner* — Thomas J Williams
(74) *Attorney, Agent, or Firm* — Oliff PLC

(57) ABSTRACT

A tubular vibration-damping device including: an inner shaft member; an outer tube member made of synthetic resin in which the inner shaft member is inserted and placed; a main rubber elastic body elastically connecting the inner shaft member and the outer tube member to each other; a flange part protruding peripherally outward from one axial end of the outer tube member; and a thick-walled portion whose axial dimension is made large being provided peripherally outside of a proximal end of the flange part.

6 Claims, 8 Drawing Sheets

(56) References Cited

U.S. PATENT DOCUMENTS

2010/0065998 A1   3/2010  Tomida et al.
2012/0018937 A1*  1/2012  Namito ................. F16F 1/3842
                                                                267/141.2

FOREIGN PATENT DOCUMENTS

| EP | 2 644 930 A2 | 10/2013 |
| JP | H07-41105 U | 7/1995 |
| JP | 2000-130485 A | 5/2000 |
| JP | 2001-193776 A | 7/2001 |
| JP | 2002276714 A * | 9/2002 |
| JP | 2007-177820 A | 7/2007 |
| JP | 2009-264568 A | 11/2009 |
| JP | 2010-019342 A | 1/2010 |
| JP | 2011-099522 A | 5/2011 |
| JP | 2011-106651 A | 6/2011 |
| JP | 2012-127452 A | 7/2012 |
| JP | 5567463 B2 | 8/2014 |
| WO | 2012/132105 A1 | 10/2012 |

OTHER PUBLICATIONS

Mar. 28, 2017 International Preliminary Report on Patentability issued in International Patent Application No. PCT/JP2015/074879.
Jan. 25, 2018 Office Action issued in Chinese Patent Application No. 20150032825.4.
Mar. 14, 2018 Office Action issued in Japanese Patent Application No. 2014-194596.

* cited by examiner

PRIOR ART

TUBULAR VIBRATION-DAMPING DEVICE

INCORPORATED BY REFERENCE

The disclosure of Japanese Patent Application No. 2014-194596 filed on Sep. 25, 2014 including the specification, drawings and abstract is incorporated herein by reference in its entirety. This is a Continuation of International Application No. PCT/JP2015/074879 filed on Sep. 1, 2015.

BACKGROUND OF THE INVENTION

1. Field of the Invention

The present invention relates generally to a tubular vibration-damping device for use in an automotive member mount, suspension bushing or the like, for example.

2. Description of the Related Art

Conventionally, tubular vibration-damping devices have been known as one type of vibration damping supports or vibration damping connectors interposed between components that make up a vibration transmission system in order to provide vibration damping linkage between the components. The tubular vibration-damping device has a structure in which an inner shaft member is inserted and placed into an outer tube member, and the inner shaft member and the outer tube member are elastically connected by a main rubber elastic body arranged therebetween in the radial direction. The device is employed as an automotive member mount, suspension bushing or the like.

Besides, with regard to the outer tube member, as shown in U.S. Pat. No. 7,104,533, it is possible to employ a structure which includes a flange part extending in the axis-perpendicular direction and protruding peripherally outward at one axial end thereof. During press-fitting of the outer tube member into a mounting hole of an attachment member such as a sleeve, the flange part comes into abutment against the axial end face of the attachment member so as to determine the press-fit end of the outer tube member with respect to the attachment member.

Meanwhile, whereas the outer tube member is generally formed of metal such as iron or aluminum alloy, it has been attempted to employ an outer tube member formed of synthetic resin in order to reduce its weight. FIG. 8A depicts a tubular vibration-damping device 100 of conventional construction that corresponds to U.S. Pat. No. 7,104,533. The tubular vibration-damping device 100 has a structure in which an inner shaft member 102 and an outer tube member 104 made of synthetic resin are coaxially arranged and elastically connected by a main rubber elastic body 106. The outer tube member 104 includes a flange part 108 at one axial end thereof, and is configured to be press-fitted and attached to a sleeve 110 serving as the attachment member.

However, if the outer tube member 104 formed of synthetic resin is employed, there is a risk that the outer tube member 104 may be damaged at the proximal end of the flange part 108 during press-fit mounting into the sleeve 110. Specifically, when the outer tube member 104 is mounted into the sleeve 110, the outer tube member 104 undergoes diameter-constricting deformation so that the stress due to the diameter constriction will act on the proximal end of the flange part 108. Moreover, as shown in FIG. 8B, due to the diameter constriction of the outer tube member 104, the flange part 108 inclines to the front side in the press-fit direction (axial inner side) as it goes peripherally outward, while the inclined flange part 108 is pressed against the axial end face of the sleeve 110 that extends in the axis-perpendicular direction. By so doing, as depicted in FIG. 8C, the flange part 108 deforms in the direction for which the incline angle becomes smaller so that the stress due to such deformation acts on the proximal end of the flange part 108 of the outer tube member 104. Since these stresses both act concentratedly on the proximal end of the flange part 108 of the outer tube member 104, the outer tube member 104, which is formed of synthetic resin with a smaller strength than that of metal, sometimes suffers from the damage at the proximal end of the flange part 108.

SUMMARY OF THE INVENTION

It is therefore one object of the present invention to provide a tubular vibration-damping device of novel structure which is able to avoid damage to an outer tube member during press-fit mounting of the outer tube member made of synthetic resin into an attachment member such as a sleeve.

The above and/or optional objects of this invention may be attained according to at least one of the following modes of the invention. The following modes and/or elements employed in each mode of the invention may be adopted at any possible optional combinations.

Specifically, a first mode of the present invention provides a tubular vibration-damping device comprising: an inner shaft member; an outer tube member made of synthetic resin in which the inner shaft member is inserted and placed; a main rubber elastic body elastically connecting the inner shaft member and the outer tube member to each other; a flange part protruding peripherally outward from one axial end of the outer tube member; and a thick-walled portion whose axial dimension is made large being provided peripherally outside of a proximal end of the flange part.

With the tubular vibration-damping device constructed according to the first mode, the attachment member to which the outer tube member is mounted by press-fitting and a jig for pushing the outer tube member into the attachment member indirectly come into abutment with each other sandwiching the thick-walled portion of the flange part. Accordingly, the relative position of the attachment member and the jig is determined so as to determine the press-fit end of the outer tube member with respect to the attachment member. This will prevent the pushing force during press-fitting from acting directly on the proximal end of the flange part, on which the stress is likely to be concentrated, thereby improving durability.

In addition, during press-fitting of the outer tube member into the attachment member, in the case where the outer tube member is constricted in diameter and the flange part provided to the back end for press-fitting deforms so as to incline toward the front end for press-fitting as it goes peripherally outward, the amount of approaching displacement between the attachment member and the jig is limited by the thick-walled portion. Thus, the axial end face of the attachment member is positioned away from the axial inner face of the proximal end of the flange part in the axial direction. By so doing, the boundary between the press-fit portion of the outer tube member into the attachment member on which the stress due to the diameter constriction acts concentratedly and the non-press-fit portion thereof is set at the position axially remote from the proximal end of the flange part on which the stress due to inclination of the flange part during press-fitting is concentrated. This will prevent the proximal end of the flange part from being damaged by the stress concentration.

A second mode of the present invention provides the tubular vibration-damping device according to the first mode, wherein the outer tube member is configured to be attached to a mounting hole of an attachment member by press-fitting such that the flange part abuts against the attachment member at a location where the thick-walled portion is provided, and at an inner peripheral side of an abutment portion of the flange part and the attachment member, a space remains between the proximal end of the flange part and an opening end face of the mounting hole of the attachment member.

According to the second mode, the thick-walled portion of the flange part limits the amount of approaching displacement between the attachment member and the jig. Thus, with the outer tube member mounted into the mounting hole by press-fitting, a space remains between the proximal end of the flange part and the opening end face of the mounting hole of the attachment member. Therefore, the stress due to change of angle of the flange part and the stress due to diameter constriction of the outer tube member during press-fitting will be exerted on locations which are remote from each other in the direction of press-fitting, thereby enhancing durability through dispersion of the stress.

A third mode of the present invention provides the tubular vibration-damping device according to the first or second mode, wherein an outer protrusion is formed on the flange part so as to protrude from an axial outer face thereof, and a formation part of the outer protrusion on the flange part constitutes the thick-walled portion.

According to the third mode, since the attachment member and the jig indirectly come into abutment with each other via the outer protrusion, the amount of relative displacement in the direction of approach is limited. Thus, with regard to the flange part, which underwent inclining deformation during press-fitting of the outer tube member into the attachment member, when the press-fitting is completed and the flange part is pushed back so as to make its incline angle smaller, the amount of deformation due to pushing-back is made small. Therefore, the stress acting on the proximal end of the flange part which is caused by deformation due to pushing-back will be ameliorated, thereby avoiding damage, break or the like of the proximal end of the flange part.

A fourth mode of the present invention provides the tubular vibration-damping device according to any one of the first through third modes, wherein the thick-walled portion is provided continuously about an entire circumference of the flange part.

According to the fourth mode, when the press-fitting of the outer tube member is completed, the thick-walled portion is clasped between the attachment member and the jig continuously about the entire circumference. This will determine the relative position of the attachment member and the jig more stably while avoiding stress concentration on the circumference of the flange part, whereby further improvement of durability can be expected.

A fifth mode of the present invention provides the tubular vibration-damping device according to any one of the first through fourth modes, wherein the thick-walled portion is provided continuously from the proximal end to an outer peripheral side of the flange part, and the axial dimension of the thick-walled portion becomes gradually larger toward the outer peripheral side.

According to the fifth mode, since the thick-walled portion is provided continuously from the proximal end to the outer peripheral side of the flange part, sudden change in the thickness of the flange part in the direction of protrusion will be prevented. This will avoid stress concentration and enhance durability. Moreover, by employing the structure in which the axial dimension of the thick-walled portion gradually changes in the radial direction, dispersion of the stress will be more advantageously realized, thereby achieving excellent durability.

A sixth mode of the present invention provides the tubular vibration-damping device according to any one of the first through fifth modes, wherein a fillet part is formed on an axial inner face of the proximal end of the flange part.

According to the sixth mode, the proximal end of the flange part, which is likely to suffer from damage due to stress concentration, is made thicker and reinforced by the formation of the fillet part, so that damage to the proximal end of the flange part will be prevented.

A seventh mode of the present invention provides the tubular vibration-damping device according to any one of the first through sixth modes, wherein a cushioning rubber is bonded on an axial outer face of the flange part.

According to the seventh mode, the flange part comes into abutment with a partner component such as a vehicle body, which is to be attached to the inner shaft member, via the cushioning rubber. This makes it possible to obtain a stopper effect that limits relative displacement between the inner shaft member and the outer tube member in the axial direction owing to the cushioning rubber, while reducing striking noise or impact. Besides, during press-fitting of the outer tube member into the attachment member, the flange part is pushed by the jig via the cushioning rubber. Thus, damage to the flange part due to direct contact by the jig will be avoided, and pushing force by the jig will be exerted in a dispersed way over a wide area of the flange part via the cushioning rubber.

According to the present invention, the thick-walled portion whose axial dimension is made large is formed to the flange part of the outer tube member. With this arrangement, when the outer tube member is press-fitted into the mounting hole of the attachment member, the relative position of the attachment member and the jig that pushes the flange part of the outer tube member is determined by the indirect abutment of the attachment member and the jig sandwiching the thick-walled portion therebetween. Therefore, the stress acting locally on the outer tube member will be reduced, thereby improving durability.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein:

FIGS. 8A-8C are vertical cross section views showing a tubular vibration-damping device of conventional construction, wherein FIG. 8A shows the device before press-fitting into a sleeve, FIG. 8B shows a process of press-fitting the device into the sleeve, and FIG. 8C shows completion of press-fitting the device into the sleeve.

DETAILED DESCRIPTION OF PREFERRED EMBODIMENTS

Embodiments of the present invention will be described below in reference to the drawings.

Figure 1:
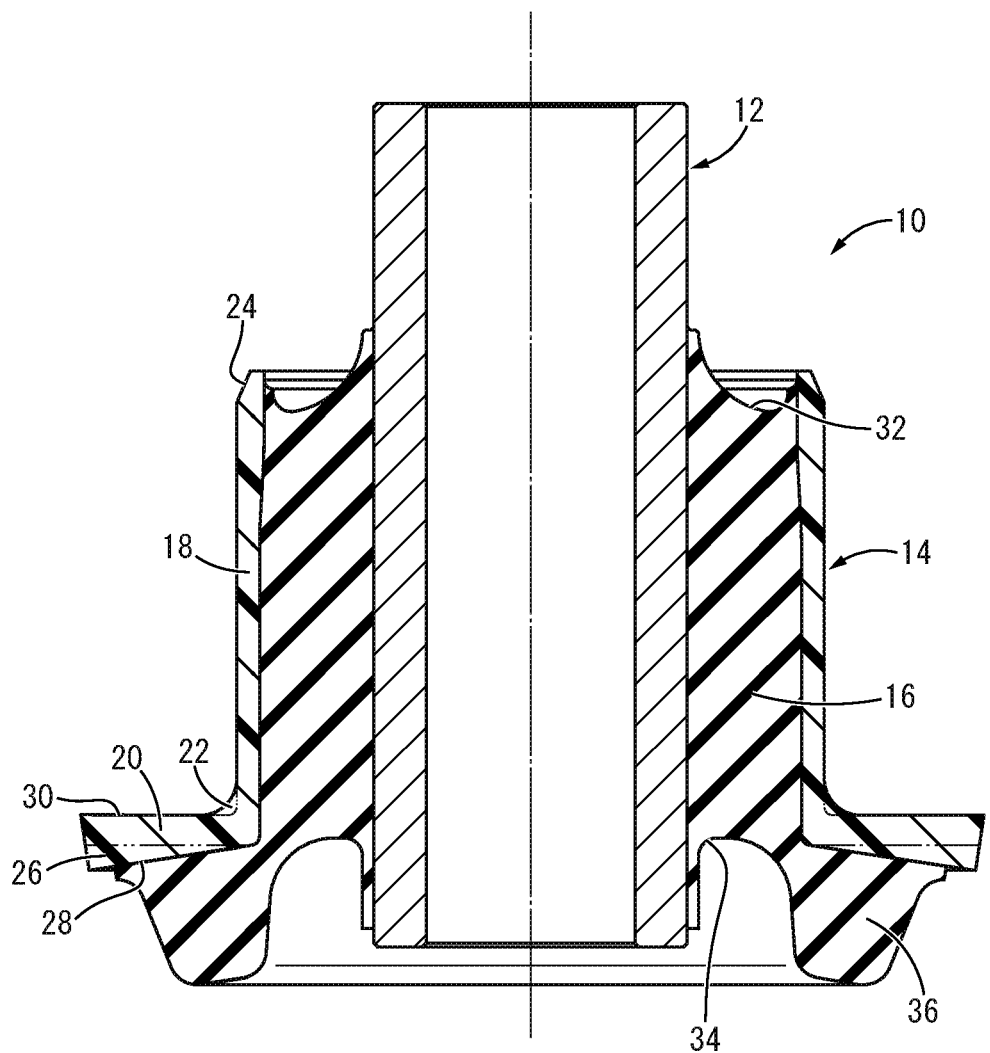
FIG. 1 is a vertical cross section view showing a tubular vibration-damping device in the form of a member mount as a first embodiment of the present invention.

Referring first to FIG. 1, there is depicted an automotive member mount 10 as a first embodiment of the tubular vibration-damping device constructed according to the present invention. The member mount 10 has a construction in which an inner shaft member 12 and an outer tube member 14 are elastically connected to each other by a main rubber elastic body 16. In the description hereinbelow, as a general rule the vertical direction refers to the vertical direction in FIG. 1.

Described more specifically, the inner shaft member 12 is a rigid member made of metal such as iron or aluminum alloy, or synthetic resin etc., and has a small-diameter, approximately round tubular shape.

The outer tube member 14 is made of synthetic resin such as polyamide, polyacetal, polyester, polycarbonate or the like, and includes a tubular part 18 having a large-diameter, approximately round tubular shape. In addition, at the axial lower end of the tubular part 18 of the outer tube member 14, a flange part 20 of generally annular disk shape is integrally formed so as to protrude peripherally outward. In the present embodiment, the connecting section between the outer circumferential surface of the tubular part 18 and the upper face of the flange part 20 is an R surface whose curvature radius in the vertical cross section larger than that of the connecting section between the inner circumferential surface of the tubular part 18 and the lower face of the flange part 20. This provides a fillet part 22 on the axial inner face of the proximal end of the flange part 20, so that the connecting section between the outer tube member 14 and the proximal end of the flange part 20 is made thick and reinforced by the fillet part 22. Note that the axial upper end of the outer tube member 14 has a tapered face 24 whose outer circumferential surface is constricted in diameter towards the top.

Moreover, on the flange part 20 of the outer tube member 14, an outer protrusion 26 is integrally formed so as to protrude from the axial outer face thereof. The outer protrusion 26 protrudes from the flange part 20 downward in FIG. 1, and in the present embodiment, is provided continuously from the proximal end to the outer peripheral end of the flange part 20 over approximately entire portion thereof in the radial direction, while being provided in an annular shape with generally constant cross section continuously about the entire circumference in the circumferential direction. Furthermore, the outer protrusion 26 is formed such that the axial dimension of protrusion from the flange part 20 becomes gradually larger toward the outer peripheral side, and the protruding distal end face of the outer protrusion 26 constitutes an inclined face 28 that gradually inclines downward toward the outer peripheral side. Besides, since an abutting face 30 constituted by the upper face of the flange part 20 extends in the roughly axis-perpendicular direction, the inclined face 28 inclines relative to the abutting face 30. Accordingly, the outer protrusion 26 makes the flange part 20 thick so as to constitute a thick-walled portion of the present embodiment. The thick-walled portion of the present embodiment is provided continuously from the proximal end to the outer peripheral side of the flange part 20 over approximately entire portion thereof, and the thickness dimension of the thick-walled portion in the axial direction becomes gradually larger toward the outer peripheral side. Additionally, the thick-walled portion is formed with generally constant cross section continuously about the entire circumference of the flange part 20. Note that in the present embodiment, the outer circumferential surface of the flange part 20 and the outer protrusion 26 is a tapered face whose diameter becomes smaller towards the bottom. Also, in FIG. 1, for illustrative purposes, the boundaries between the integrally formed parts, namely the boundary between the flange part 20 and the outer protrusion 26, and the boundary between the flange part 20 and the fillet part 22, are each hypothetically indicated by the chain double-dashed line.

The inner shaft member 12 is inserted and placed generally coaxially into the outer tube member 14, and the inner shaft member 12 and the outer tube member 14 are elastically connected to each other by the main rubber elastic body 16. The main rubber elastic body 16 has a thick-walled, generally round tubular shape, and its inner circumferential surface is bonded to the outer circumferential surface of the inner shaft member 12, while its outer circumferential surface is bonded to the inner circumferential surface of the outer tube member 14. Note that the main rubber elastic body 16 can be produced, for example, by setting the inner shaft member 12 and the outer tube member 14 prepared in advance in the mold for molding of the main rubber elastic body 16, and forming as an integrally vulcanization molded component incorporating the inner shaft member 12 and the outer tube member 14. It would also be possible, for example, to set the inner shaft member 12 prepared in advance in the mold for molding of the main rubber elastic body 16 and to form the main rubber elastic body 16 as an integrally vulcanization molded component incorporating the inner shaft member 12, and then to bond the outer tube member 14 to the main rubber elastic body 16 by injection molding of the outer tube member 14 on the outer peripheral side of the main rubber elastic body 16.

In addition, a hollow portion 32 is formed on the first axial end face of the main rubber elastic body 16, while a hollow portion 34 is formed on the second axial end face thereof. The hollow portions 32, 34 both have a recessed-groove shape that opens axially outward and extends about the entire circumference in the circumferential direction, and the free surface areas of the axial end faces of the main rubber elastic body 16 are made large due to formation of the hollow portions 32, 34.

Moreover, a cushioning rubber 36 is bonded to the flange part 20 of the outer tube member 14. The cushioning rubber 36 protrudes downward from the axial outer face of the flange part 20 and extends in the circumferential direction with a cross section that gradually becomes narrow towards the protruding distal end, and in the present embodiment, the cushioning rubber 36 has an annular shape that is continuous about the entire circumference with generally constant cross section. Furthermore, the cushioning rubber 36 of the present embodiment is integrally formed with the main rubber elastic body 16 and is bonded to the axial outer face of the outer protrusion 26, which is integrally formed with the flange part 20, so as to cover at least a portion of the outer protrusion 26. Besides, the elastic principal axis that extends in the direction of protrusion of the cushioning rubber 36 inclines with respect to the axial direction so as to be generally orthogonal to the axial outer face of the outer protrusion 26, and the protruding distal end face of the cushioning rubber 36 is a tapered face that extends generally parallel to the axial outer face of the outer protrusion 26.

The member mount 10 of the above construction is configured to be attached to a vehicle body (not shown) by, for example, a bolt (not shown) being inserted through the inner shaft member 12. Meanwhile, the outer tube member 14 is configured to be attached to a sleeve 38 serving as an attachment member, as shown in FIGS. 2 and 3.

Figure 2:
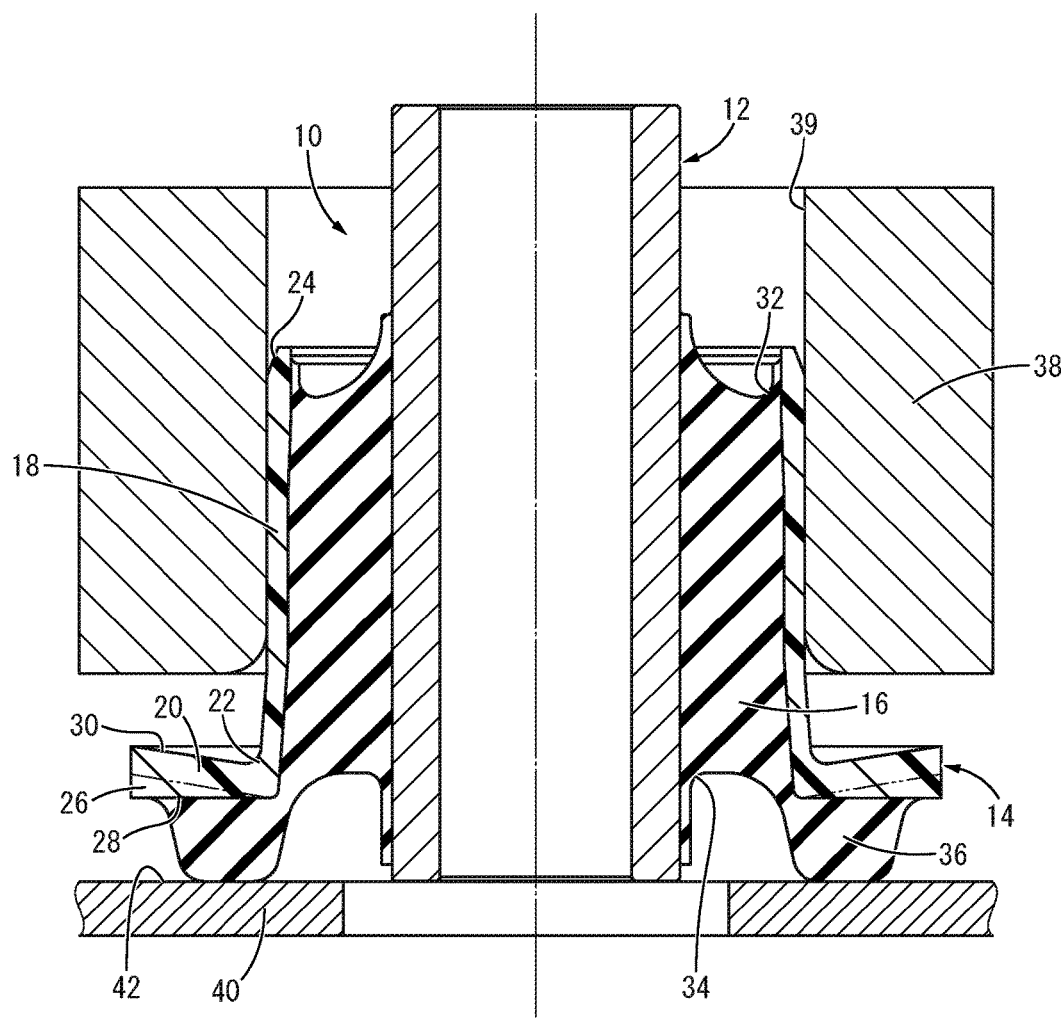
FIG. 2 is a vertical cross section view showing a process of press-fitting the member mount of FIG. 1 into a sleeve.
Figure 3:
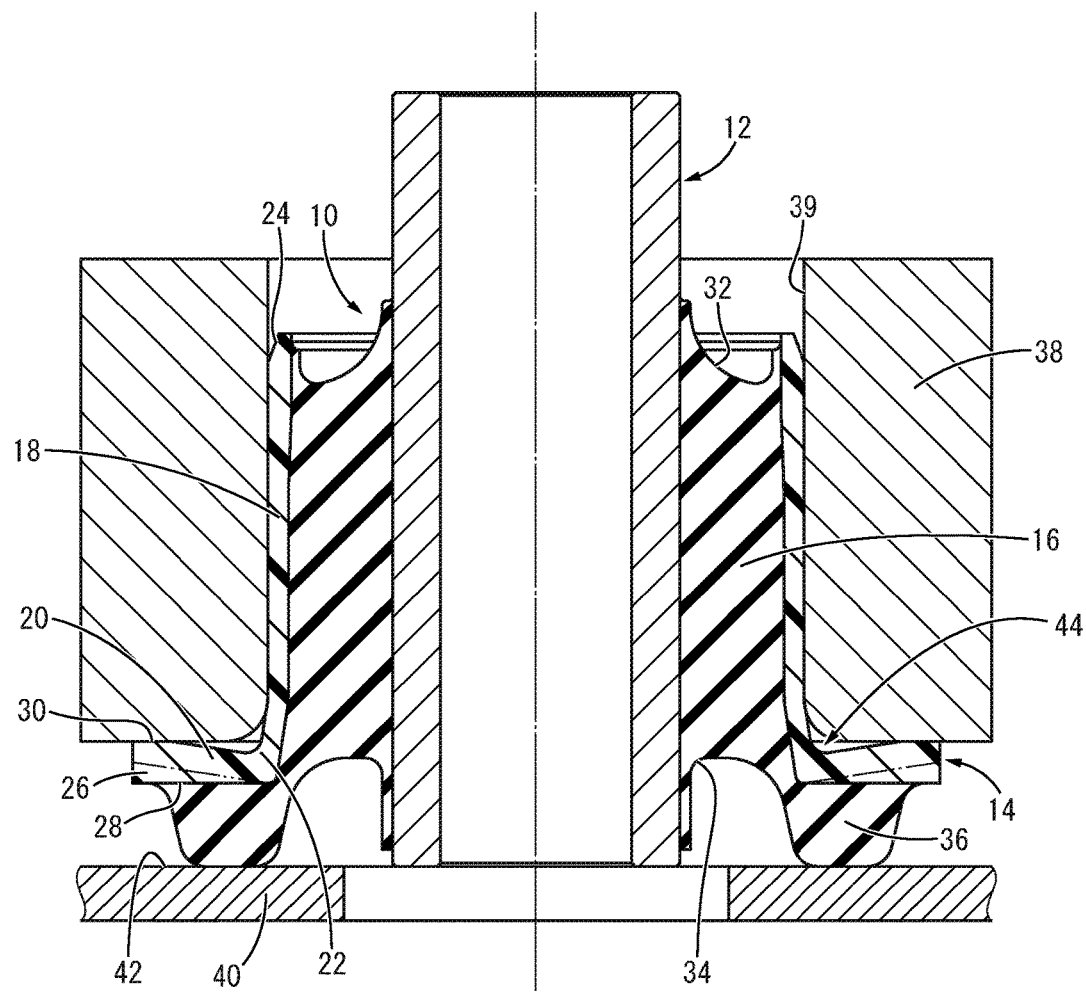
FIG. 3 is a vertical cross section view showing completion of press-fitting the member mount of FIG. 1 into the sleeve.

Specifically, as shown in FIG. 2, the tubular part 18 of the outer tube member 14 is press-fitted into a mounting hole 39 of the sleeve 38 having a generally round tubular shape so that one axial end of the tubular part 18, which is provided with the flange part 20, will be the back end in the direction of press-fitting. Namely, the press-fitting is started from the other axial end of the tubular part 18. The outer tube member 14 is press-fitted into the sleeve 38 by, for example, pushing the flange part 20 with a jig 40 via the cushioning rubber 36 in the axial direction with the sleeve 38 held positioned in the axial direction. In other words, the outer tube member 14 is press-fitted into the sleeve 38 by a push-operating surface 42 of the jig 40 being pressed against the flange part 20 via the cushioning rubber 36 in the axial direction so that the pushing force in the axial direction is exerted on the outer tube member 14. Also, the press-fit end of the outer tube member 14 is configured to be determined by the flange part 20 abutting against the axial end face of the sleeve 38 at the thick-walled portion where the outer protrusion 26 is provided.

Moreover, in order to effectively obtain the fastening force by press-fitting, the outside diameter dimension of the tubular part 18 of the outer tube member 14 is made larger than the diametrical inside dimension of the sleeve 38 (diameter of the mounting hole 39), so that the tubular part 18 of the outer tube member 14 undergoes diameter-constricting deformation by the press-fitting into the sleeve 38. Then, the main rubber elastic body 16 is pre-compressed in the radial direction due to the press-fitting of the outer tube member 14 into the sleeve 38. Besides, on the press-fit portion of the tubular part 18 into the sleeve 38, a radially inward force is exerted such that a relatively large stress will be acted on the vicinity of the boundary between the press-fit portion and the non-press-fit portion of the tubular part 18.

Furthermore, since the other axial end of the tubular part 18 of the outer tube member 14 undergoes diameter-constricting deformation due to press-fitting into the sleeve 38, the diameter of the other axial end of the tubular part 18 which is press-fitted into the sleeve 38 becomes smaller than that of the one axial end thereof which is not press-fitted into the sleeve 38. By so doing, as shown in FIG. 2, the one axial end of the outer tube member 14 which is not press-fitted into the sleeve 38 becomes tapered so as to incline peripherally outward as it goes away from the other axial end of the outer tube member 14 which is press-fitted into the sleeve 38. As a result, the flange part 20 of the outer tube member 14 inclines inward in the axial direction as it goes toward the protruding distal end, and the axial inner face of the flange part 20 becomes an inclined face that inclines upward as it goes toward the protruding distal end, while the incline angle of the axial outer face of the flange part 20 constituted by the outer protrusion 26 becomes smaller.

Then, when the outer tube member 14 is press-fitted into the sleeve 38 and has reached its prescribed press-fit end, as shown in FIG. 3, the sleeve 38 and the jig 40 indirectly come into abutment with each other sandwiching the thick-walled portion of the flange part 20 where the outer protrusion 26 is provided, thereby limiting the amount of approaching displacement between the sleeve 38 and the jig 40 in the axial direction. As a result, in the state where the outer tube member 14 is press-fitted into the sleeve 38 and has reached its press-fit end, at the inner peripheral side of the abutment portion of the flange part 20 and the sleeve 38, a space 44 remains between the axial inner face of the proximal end of the flange part 20 and the axial end face of the sleeve 38 where the mounting hole 39 opens, namely the proximal end of the flange part 20 and the sleeve 38 are remote from each other in the axial direction. Therefore, the location on which the stress due to diameter constriction of the tubular part 18 mainly acts is remote axially inward from the proximal end of the flange part 20 on which the stress due to angle change of the flange part 20 and the tubular part 18 mainly acts. This will prevent the proximal end of the flange part 20 from being damaged by the stress concentration, thereby improving durability.

Note that the outer protrusion 26 is what determines the pressing end of the outer tube member 14 during press-fitting into the sleeve 38, and may directly abut against both of the axial end face of the sleeve 38 and the push-operating surface 42 of the jig 40, or may indirectly abut against at least one of the axial end face of the sleeve 38 and the push-operating surface 42 of the jig 40 via a rubber or the like.

In addition, the amount of approaching displacement of the jig 40 with respect to the sleeve 38 is limited by the outer peripheral portion of the flange part 20 and the cushioning rubber 36 being sandwiched between the axially opposite jig 40 and sleeve 38. This will reduce change in the incline angle of the flange part 20 due to pressing of the outer tube member 14 by the jig 40. As a result, the stress due to angle change of the flange part 20 relative to the tubular part 18 will be reduced at the proximal end of the flange part 20, thereby improving durability of the outer tube member 14.

Moreover, the fillet part 22 is provided on the axial inner face of the proximal end of the flange part 20 so as to make the proximal end of the flange part 20 thicker. Thus, excellent durability can be obtained against inclination of the flange part 20 with respect to the tubular part 18.

Also, in the present embodiment, since the outer protrusion 26 is provided continuously about the entire circumference with generally constant cross section, the press-fit end of the outer tube member 14 with respect to the sleeve 38 is more stably determined. Besides, the load during press-fitting will act on the outer protrusion 26 roughly evenly along the circumference, so that durability thereof can also be enhanced.

Additionally, the outer protrusion 26 is provided continuously from the proximal end to the protruding distal end of the flange part 20. This will prevent stress concentration on the flange part 20, thereby improving durability. Furthermore, with the outer protrusion 26 of the present embodiment, the protruding height gradually changes in the radial direction of the flange part 20, and the axial outer face of the outer protrusion 26 is a generally plane shape which has no stepped parts or irregularities. Thus, the stress will be more advantageously dispersed so as to enhance durability.

Figure 4:
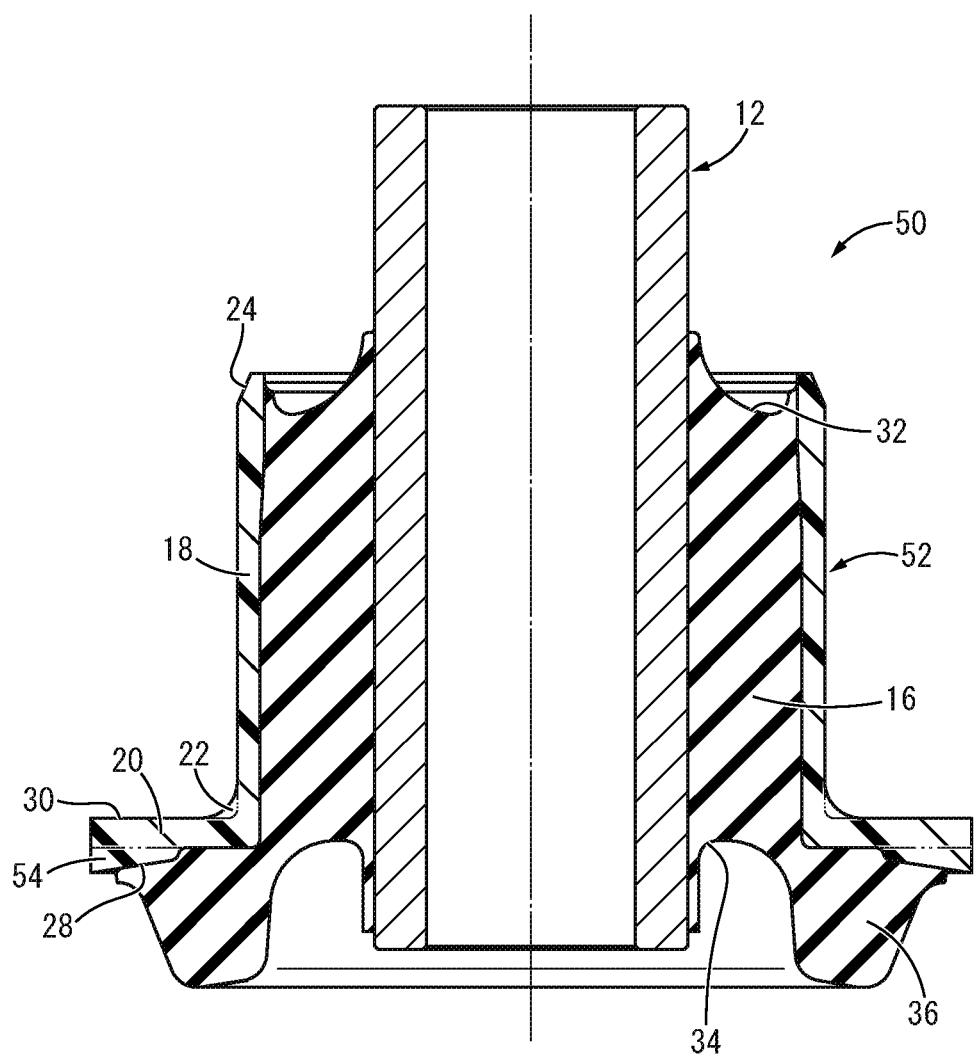
FIG. 4 is a vertical cross section view showing a member mount as a second embodiment of the present invention.

Next, FIG. 4 depicts a member mount 50 as a second embodiment of the tubular vibration-damping device related to the present invention. The member mount 50 has a structure in which the inner shaft member 12 and an outer tube member 52 are elastically connected to each other by the main rubber elastic body 16, and an outer protrusion 54 is integrally formed with the flange part 20 of the outer tube member 52 so as to constitute a thick-walled portion. In the following description, components and parts that are substantially identical with those in the preceding first embodiment will be assigned like symbols and not described in any detail.

The outer protrusion 54 is provided partially in the protruding distal end (outer peripheral end) of the flange part 20 and protrudes downward. Also, the protruding height of the outer protrusion 54 gradually becomes greater toward the outer peripheral side, and the axial outer face of the outer protrusion 54 constitutes the inclined face 28 that inclines with respect to the radial direction. Note that the axial outer face of the flange part 20 extends in the axis-perpendicular direction on its inner peripheral side away from the outer protrusion 54.

The cushioning rubber 36 bonded to the flange part 20 is provided so as to cover the axial outer face of the flange part 20 including the protruding distal end face thereof, and protrudes axially outward. Note that in the present embodiment, the inner peripheral portion of the outer protrusion 54 is covered by the cushioning rubber 36, while the outer peripheral portion of the outer protrusion 54 is exposed without being covered by the cushioning rubber 36. While the cushioning rubber 36 does not necessarily cover the outer protrusion 54, in the case where the cushioning rubber 36 is provided away from the outer protrusion 54, the protruding height of the cushioning rubber 36 is set such that the outer protrusion 54 abuts against the push-operating surface 42 of the jig 40 during press-fitting of the outer tube member 52 into the sleeve 38.

Like the member mount 50 constructed according to the present embodiment, even with the structure in which the outer protrusion 54 is provided to the flange part 20 in a partial manner, it is possible to enhance durability of the outer tube member 52 made of synthetic resin, similarly to the first embodiment.

Figure 5:
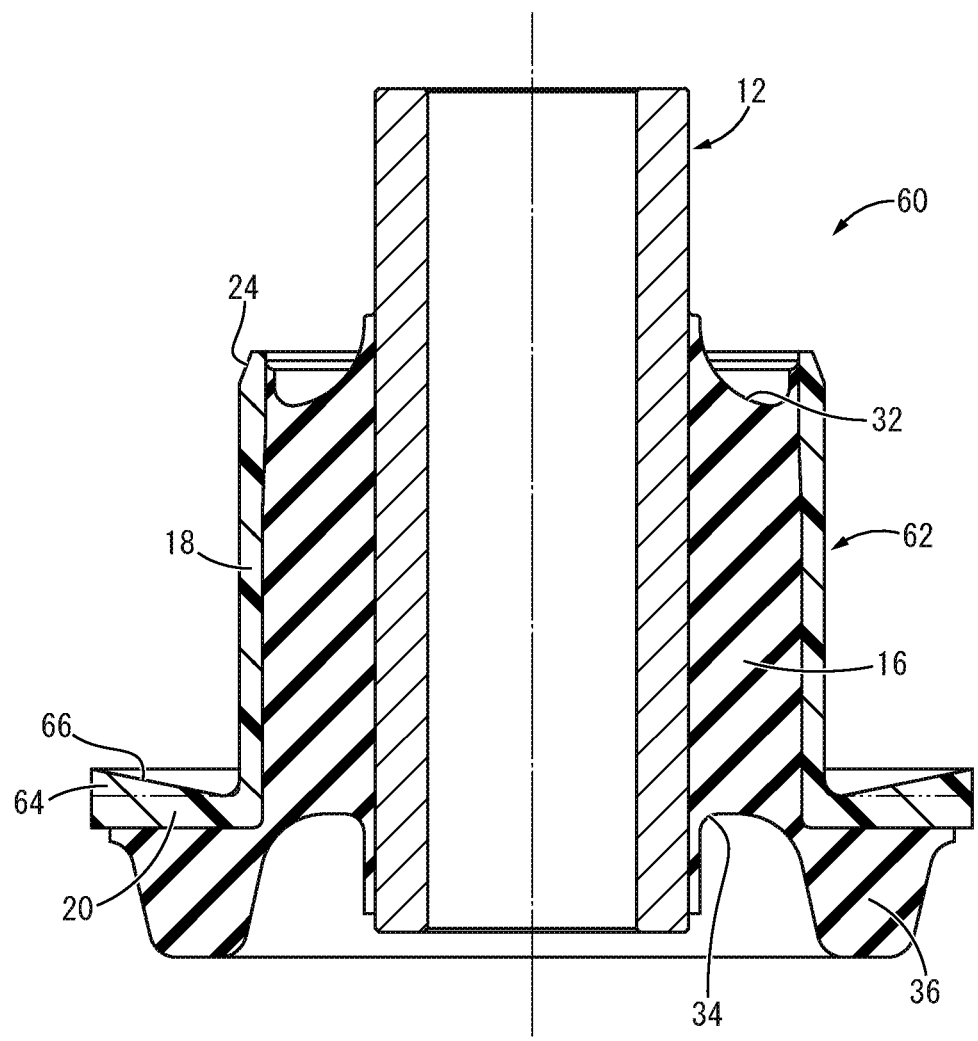
FIG. 5 is a vertical cross section view showing a member mount as a third embodiment of the present invention.

FIG. 5 depicts a member mount 60 as a third embodiment of the tubular vibration-damping device related to the present invention. The member mount 60 has a structure in which the inner shaft member 12 and an outer tube member 62 are elastically connected to each other by the main rubber elastic body 16, and an inner protrusion 64 is integrally formed with the flange part 20 of the outer tube member 62. In the following description, components and parts that are substantially identical with those in the preceding first embodiment will be assigned like symbols and not described in any detail.

The inner protrusion 64 protrudes from the axial inner face of the flange part 20, and is provided from the proximal end to the protruding distal end of the flange part 20 over approximately entire portion thereof. Besides, the inner protrusion 64 has a cross sectional shape whose protruding dimension becomes gradually larger toward the outer peripheral side, and extends continuously in an annular shape with generally constant cross section. By such inner protrusion 64 being integrally formed with the flange part 20, the axial inner face of the flange part 20, which is defined by the protruding distal end face of the inner protrusion 64, constitutes an inclined face 66 that inclines upward toward the outer peripheral side. On the other hand, in the present embodiment, the axial outer face of the flange part 20 extends in the roughly axis-perpendicular direction.

Figure 6:
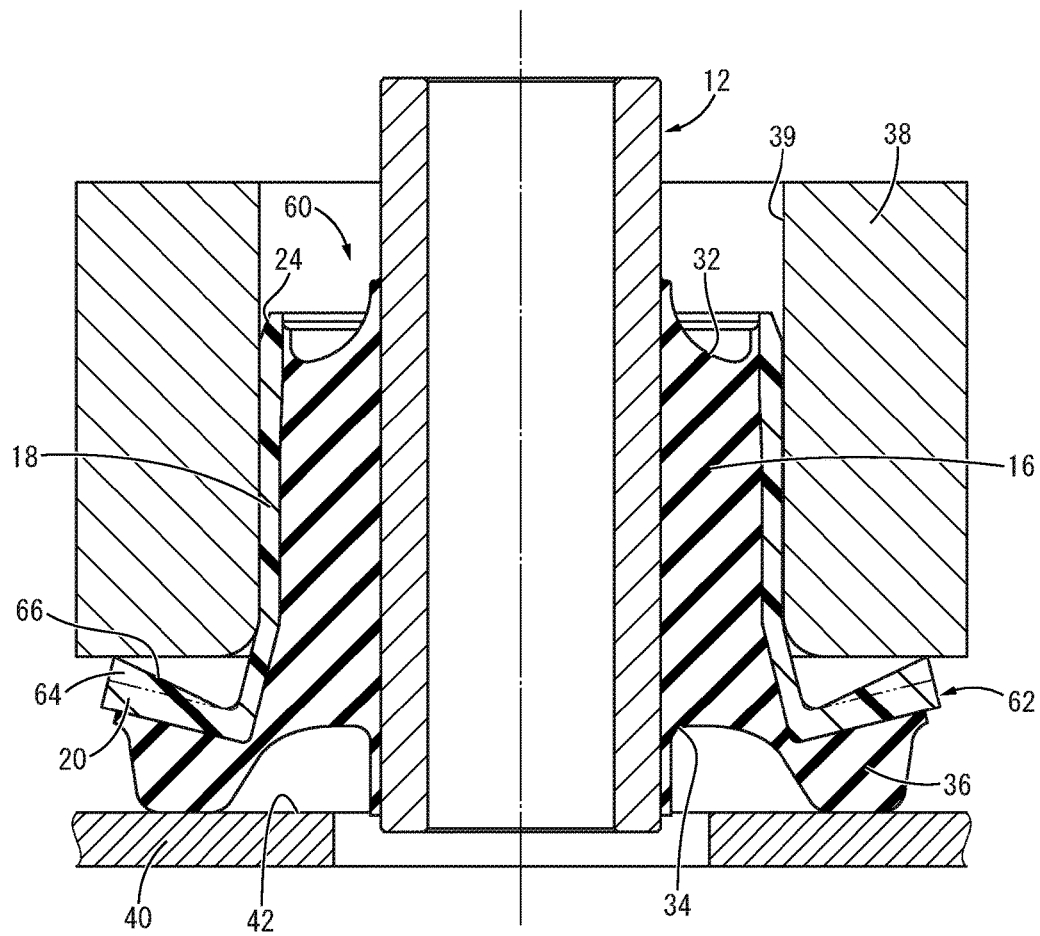
FIG. 6 is a vertical cross section view showing a process of press-fitting the member mount of FIG. 5 into the sleeve.
Figure 7:
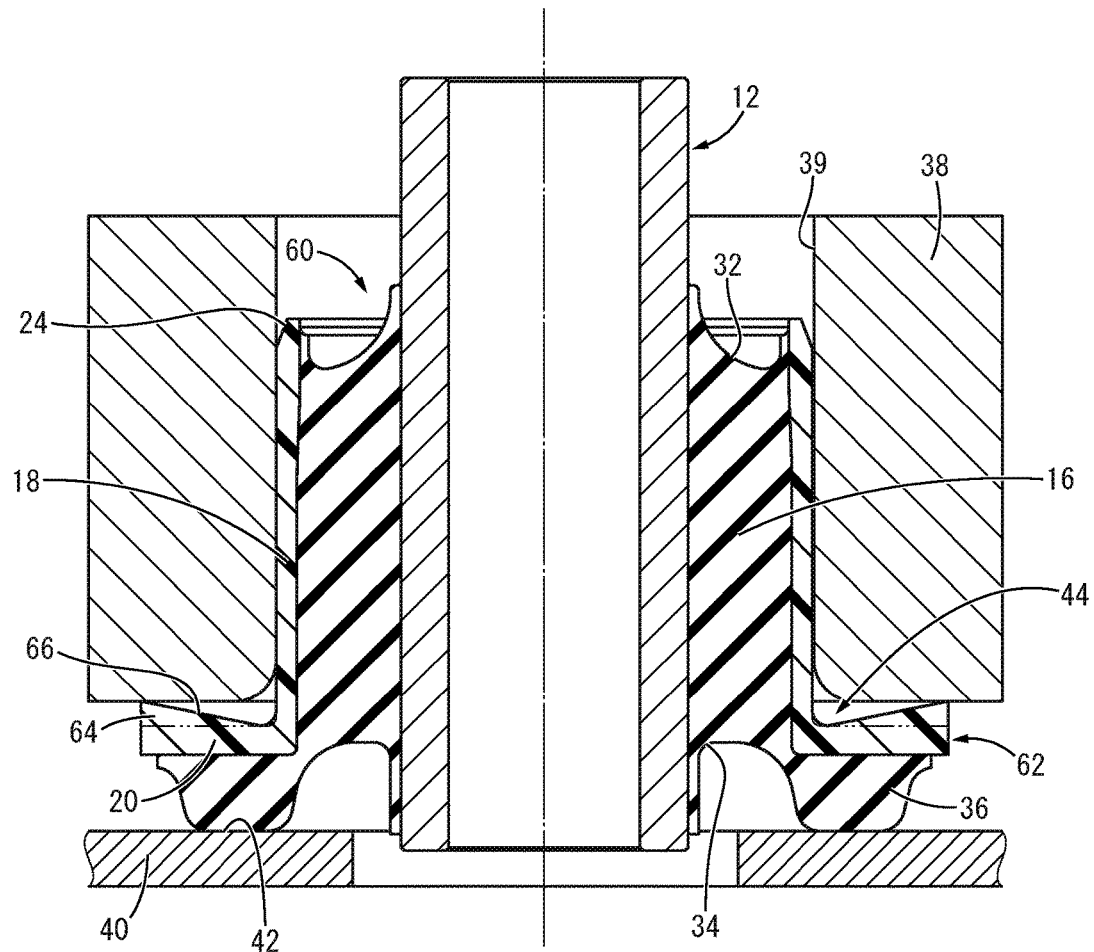
FIG. 7 is a vertical cross section view showing completion of press-fitting the member mount of FIG. 5 into the sleeve.
Figure 8A:
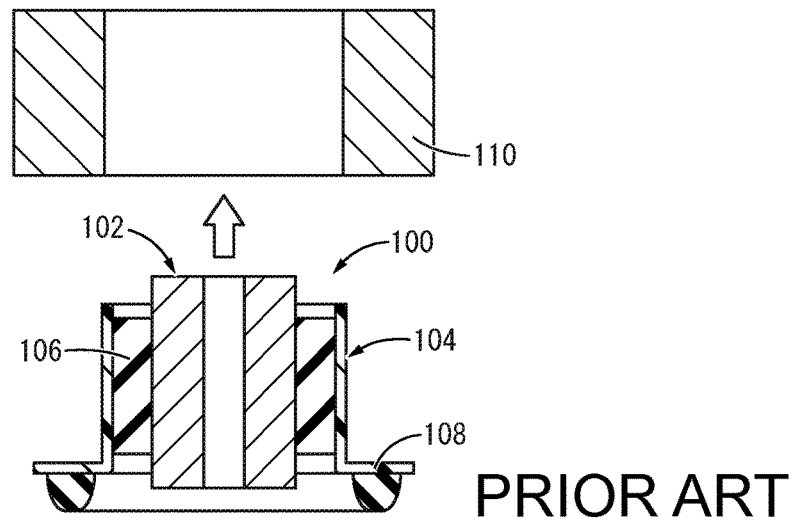
Figure 8B:
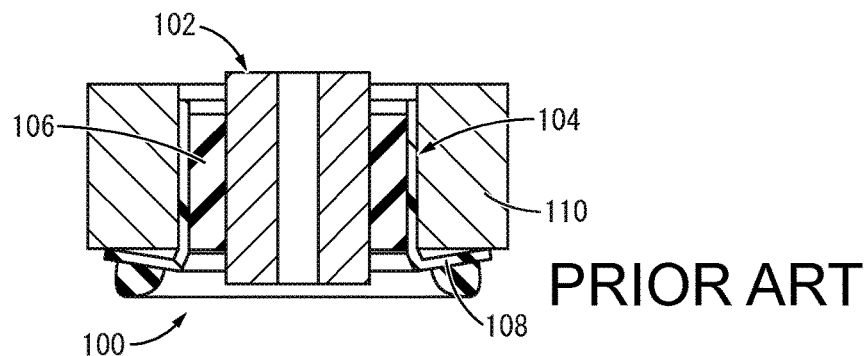
Figure 8C:
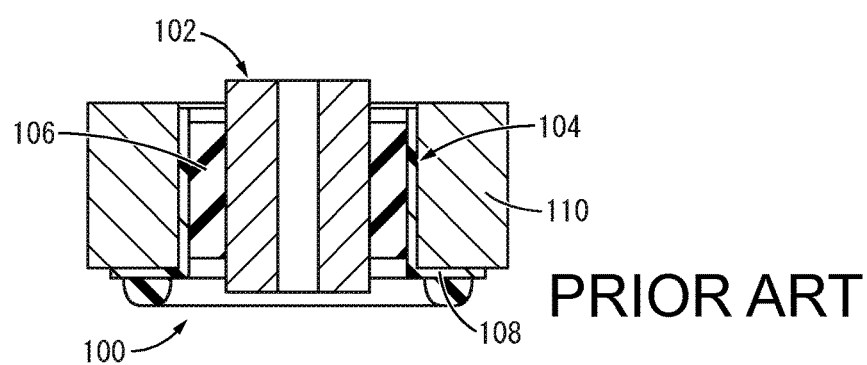

With regard to the member mount 60 of the above construction, similarly to the first embodiment, the tubular part 18 of the outer tube member 62 is press-fitted into the sleeve 38, and a relatively large stress will be acted on the boundary between the press-fit portion and the non-press-fit portion of the tubular part 18 into the sleeve 38. Also, when the outer tube member 62 is constricted in diameter due to press-fitting into the sleeve 38, as shown in FIG. 6, the flange part 20 provided to the back end for press-fitting, which is not press-fitted into the sleeve 38, deforms so as to incline toward the front end for press-fitting (inward in the axial direction) as it goes peripherally outward. Then, when the outer tube member 62 is press-fitted into the sleeve 38 until it reaches the prescribed press-fit end and the press-fitting is completed, as shown in FIG. 7, the flange part 20, which underwent inclining deformation, is sandwiched between the axial end face of the sleeve 38 and the push-operating surface 42 of the jig 40 and is deformed so as to make its incline angle smaller. Accordingly, stress due to pushing-back of the flange part 20 will act on the proximal end of the flange part 20.

Here, the press-fit end of the outer tube member 62 with respect to the sleeve 38 is determined by the sleeve 38 and the jig 40 being indirectly in contact with each other sandwiching the formation part of the inner protrusion 64 (thick-walled portion). Then, the location on which the stress due to diameter constriction of the tubular part 18 acts and the location on which the stress due to change of incline angle of the flange part 20 acts are set at the locations which are remote from each other in the axial direction. By so doing, the outer tube member 62 made of synthetic resin is prevented from being damaged by stress concentration, thereby obtaining sufficient durability.

Note that also in the case where the thick-walled portion is provided by the inner protrusion 64 protruding axially inward, it is not necessary for the thick-walled portion to be provided over the entire portion of the flange part 20 in the direction of protrusion (radial direction) thereof. It may be partially provided, for example, at the outer peripheral end or at the radially medial portion of the flange part 20.

While the present invention has been described in detail hereinabove in terms of the preferred embodiments, the invention is not limited by the specific disclosures thereof. For example, it is sufficient for the thick-walled portion to determine the press-fit end of the outer tube member with respect to the attachment member further on the protruding distal end side (peripherally outside) than the proximal end (inner peripheral end) of the flange part, and the thick-walled portion is not necessarily provided at the outer peripheral end of the flange part. For example, the thick-walled portion may be partially provided at the radially medial portion of the flange part.

Besides, in consideration of inclination of the flange part 20 due to press-fitting of the tubular part 18 into the sleeve 38, it is desirable that the protruding distal end face of the outer protrusion 26 be the inclined face 28 that inclines with respect to the plane extending in the axis-perpendicular direction, as shown in the first embodiment. However, for example, it may alternatively be a plane that extends in the axis-perpendicular direction.

Moreover, whereas the abutting face 30 of the flange part 20 against the sleeve 38 may extend in the axis-perpendicular direction, it may alternatively incline inward in the axial direction as it goes toward the outer peripheral side in advance, for example. Furthermore, the abutting face 30 of the flange part 20 may incline outward in the axial direction as it goes toward the outer peripheral side, and in that case, the incline angle thereof is set such that the flange part 20 will deform so as to incline inward in the axial direction as it goes toward the outer peripheral side during the press-fitting process of the outer tube member 14 into the sleeve 38. Note that in the case where the inner protrusion is partially provided on the abutting face 30 side so as to constitute the thick-walled portion, it would be acceptable to assume a hypothetical line that connects the protruding distal end of the inner protrusion and the proximal end of the flange part when viewed in vertical cross section, and consider the above-mentioned change of inclination during the press-fitting process as the inclination of the hypothetical line.

In addition, the fillet part 22 provided on the axial inner face of the proximal end of the flange part 20 can be appropriately changed in its shape or size, and is not essential but may be omitted. Moreover, whereas the flange part 20 in the preceding embodiments is provided in a bent shape so as to be angular with respect to the tubular part 18 when viewed in vertical cross section (see FIG. 1), the flange part 20 may alternatively have a curved shape, for example, which extends with a prescribed curvature radius when viewed in vertical cross section. This makes it possible to more effectively ameliorate the stress concentration at the connecting section between the tubular part and the flange part.

Also, from the perspective of easy production achieved by reducing the number of parts or the like, it is desirable for the cushioning rubber 36 to be integrally formed with the main rubber elastic body 16. However, for example, the cushioning rubber 36 may alternatively be formed separately from the main rubber elastic body 16, with a rubber material whose characteristics are different from those of the main rubber elastic body 16.

Furthermore, the present invention is not limited to implementation in solid tubular vibration-damping devices shown in the preceding embodiments only, and is preferably adaptable to implementation in fluid-filled tubular vibration-damping devices that utilize vibration damping effect based on the flow action etc. of non-compressible fluid or liquid sealed therein. Additionally, the preceding embodiments illustrated the tubular vibration-damping devices according to the present invention which were implemented in the member mounts by way of example. However, the tubular vibration-damping devices according to the present invention may also be implemented in, for example, suspension bushings, engine mounts, or the like.

What is claimed is:

1. A tubular vibration-damping device comprising:
   an inner shaft member;
   an outer tube member made of synthetic resin in which the inner shaft member is inserted and placed;
   a main rubber elastic body elastically connecting the inner shaft member and the outer tube member to each other;
   a flange part protruding peripherally outward from one axial end of the outer tube member; and
   a thick-walled portion whose axial dimension is made large being provided peripherally outside of a proximal end of the flange part, the thick-walled portion being provided continuously about an entire circumference of the flange part.

2. The tubular vibration-damping device according to claim 1, wherein the outer tube member is configured to be attached to a mounting hole of an attachment member by press-fitting such that the flange part abuts against the attachment member at a location where the thick-walled portion is provided, and at an inner peripheral side of an abutment portion of the flange part and the attachment member, a space remains between the proximal end of the flange part and an opening end face of the mounting hole of the attachment member.

3. The tubular vibration-damping device according to claim 1, wherein an outer protrusion is formed on the flange part so as to protrude from an axial outer face thereof, and a formation part of the outer protrusion on the flange part constitutes the thick-walled portion.

4. The tubular vibration-damping device according to claim 1, wherein the thick-walled portion is provided continuously from the proximal end to an outer peripheral side of the flange part, and the axial dimension of the thick-walled portion becomes gradually larger toward the outer peripheral side.

5. The tubular vibration-damping device according to claim 1, wherein a fillet part is formed on an axial inner face of the proximal end of the flange part.

6. The tubular vibration-damping device according to claim 1, wherein a cushioning rubber is bonded on an axial outer face of the flange part.

* * * * *